US011144313B2

(12) United States Patent
Nakaike

(10) Patent No.: US 11,144,313 B2
(45) Date of Patent: Oct. 12, 2021

(54) MERGING CHANGES FROM UPSTREAM CODE TO A BRANCH

(71) Applicant: INTERNATIONAL BUSINESS MACHINES CORPORATION, Armonk, NY (US)

(72) Inventor: Takuya Nakaike, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 55 days.

(21) Appl. No.: 16/791,833

(22) Filed: Feb. 14, 2020

(65) Prior Publication Data
US 2021/0255852 A1 Aug. 19, 2021

(51) Int. Cl.
| G06F 8/71 | (2018.01) |
| G06F 8/75 | (2018.01) |
| G06F 9/46 | (2006.01) |
| G06F 8/41 | (2018.01) |
| G06F 8/73 | (2018.01) |

(52) U.S. Cl.
CPC .............. *G06F 8/71* (2013.01); *G06F 8/423* (2013.01); *G06F 8/73* (2013.01); *G06F 8/751* (2013.01); *G06F 9/466* (2013.01)

(58) Field of Classification Search
None
See application file for complete search history.

(56) References Cited

U.S. PATENT DOCUMENTS

| 9,430,229 B1 * | 8/2016 | Van Zijst ............... G06F 9/3844 |
| 10,175,976 B1 | 1/2019 | Chheda et al. |
| 2012/0159434 A1 * | 6/2012 | Dang ....................... G06F 8/36 717/120 |
| 2015/0106790 A1 * | 4/2015 | Bigwood ............ G06F 11/3624 717/127 |
| 2016/0062736 A1 | 3/2016 | Stanfill et al. |
| 2016/0170745 A1 * | 6/2016 | Best ........................ G06F 8/658 717/122 |

(Continued)

OTHER PUBLICATIONS

Mori et al., "Effects of Recency and Commits Aggregation on Change Guide Method Based on Change History Analysis", ICSEA 2015: The Tenth International Conference on Software Engineering Advances, Nov. 2015, pp. 96-101.

(Continued)

*Primary Examiner* — Philip Wang
*Assistant Examiner* — Rongfa P Wang
(74) *Attorney, Agent, or Firm* — Tutunjian & Bitetto, P.C.; Randall Bluestone

(57) ABSTRACT

A computer-implemented method is provided for program repository management. The method includes identifying commits in an upstream commit log of an upstream branch and commits in a development commit log of a development branch. The method further includes extracting the commits in the development commit log of the development branch. The method also includes identifying, by a hardware processor in the upstream commit log, a code which is identical or similar to the extracted commits from the commit log of the development branch. The method additionally includes showing the identified code as a commit candidate of change in an upstream program code.

18 Claims, 6 Drawing Sheets

(56) References Cited

U.S. PATENT DOCUMENTS

| | | | |
|---|---|---|---|
| 2017/0039126 A1* | 2/2017 | Wood | G06F 11/3628 |
| 2017/0060575 A1* | 3/2017 | Agrawal | G06F 8/71 |
| 2018/0239898 A1* | 8/2018 | Haerterich | G06F 8/71 |
| 2019/0163478 A1* | 5/2019 | Cimadamore | G06F 9/30058 |
| 2019/0287029 A1* | 9/2019 | Sobran | G06N 20/00 |
| 2019/0332524 A1* | 10/2019 | Jayaswal | G06F 11/3664 |
| 2020/0285462 A1* | 9/2020 | Sabath | G06F 8/71 |
| 2021/0042216 A1* | 2/2021 | Magnezi | G06F 8/71 |

OTHER PUBLICATIONS

Mell et al. "The NIST Definition of Cloud Computing", NIST Special Publication 800-145, 2011, 7 pages.

* cited by examiner

MERGING CHANGES FROM UPSTREAM CODE TO A BRANCH

BACKGROUND

The present invention generally relates to computer processing, and more particularly to merging changes from upstream code to a branch. In at least some version control systems, developers create their own development branches from an upstream branch to make their changes. That is, for any development work, or hotfixes, or research work, developers typically create a new (development) branch from an upstream branch, and make code changes on the new (development) branch. If the developers are satisfied with the code changes on the new (development) branch, then the developers merge the code changes to the upstream branch. For example, developers create commits on the development branches for their changes. Moreover, developers merge their commits on the development branches to the upstream branch after finishing their development (referred to as DevToUpstream merge). Developers merge the commits that are created on an upstream branch during their development to their development branches before DevToUpstream merge (referred to as UpstreamToDev merge). Developers need to perform UpstreamToDev merges many times as long as committers for an upstream branch do not accept the changes from the developers. Hence, there is a need for easing UpstreamToDev merges

SUMMARY

According to an aspect of the present invention, a computer-implemented method is provided for program repository management. The method includes identifying commits in an upstream commit log of an upstream branch and commits in a development commit log of a development branch. The method further includes extracting the commits in the development commit log of the development branch. The method also includes identifying, by a hardware processor in the upstream commit log, a code which is identical or similar to the extracted commits from the commit log of the development branch. The method additionally includes showing the identified code as a commit candidate of change in an upstream program code.

According to another aspect of the present invention, a computer program product is provided for program repository management. The computer program product includes a non-transitory computer readable storage medium having program instructions embodied therewith. The program instructions are executable by a computer of the program repository management system to cause the computer to perform a method. The method includes identifying commits in an upstream commit log of an upstream branch and commits in a development commit log of a development branch. The method further includes extracting the commits in the development commit log of the development branch. The method also includes identifying, by a hardware processor of the computer in the upstream commit log, a code which is identical or similar to the extracted commits from the commit log of the development branch. The method additionally includes showing, by the hardware processor, the identified code as a commit candidate of change in an upstream program code.

According to yet another aspect of the present invention, a program repository management system is provided. The program repository management system includes a memory device including program code stored thereon. The program repository management system further includes a hardware processor, operatively coupled to the memory device, and configured to run the program code stored on the memory device to identify commits in an upstream commit log of an upstream branch and commits in a development commit log of a development branch. The hardware processor is further configured to the run the program code to extract the commits in the development commit log of the development branch. The hardware processor is also configured to identify, in the upstream commit log, a code which is identical or similar to the extracted commits from the commit log of the development branch. The hardware processor is additionally configured to show the identified code as a commit candidate of change in an upstream program code.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to merging changes from upstream code to a branch.

Embodiments of the present invention advantageously ease UpstreamToDev merges. In an embodiment, the present invention shows the past changes on a development branch to developers as the candidates of (e.g., required) changes to the newly added code on an upstream branch.

Figure 1:
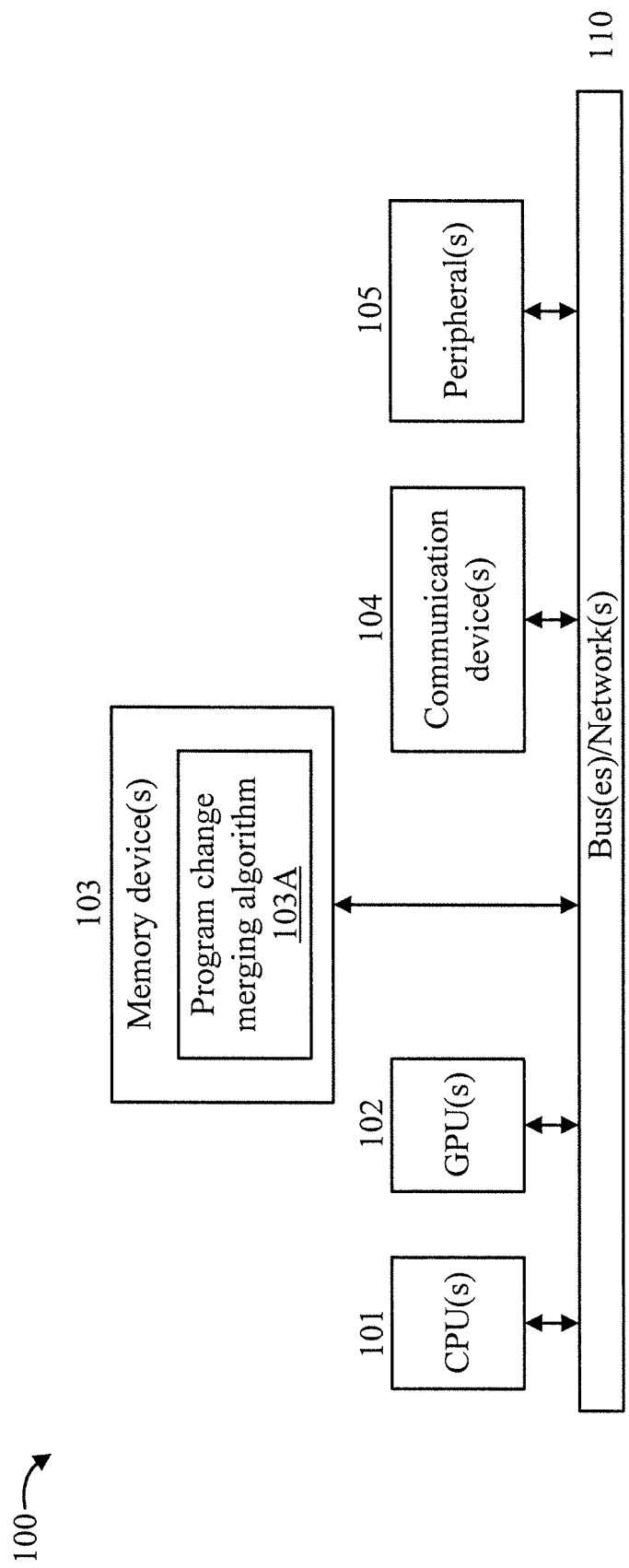
FIG. 1 is a block diagram showing an exemplary processing system, in accordance with an embodiment of the present invention.

FIG. 1 is a block diagram showing an exemplary processing system 100, in accordance with an embodiment of the present invention. In an embodiment, the processing system is included in a program repository management system. In an embodiment, the program repository management system is included in a version control system.

The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 103 can store a program change merging algorithm 103A for merging changes from upstream code to a branch.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
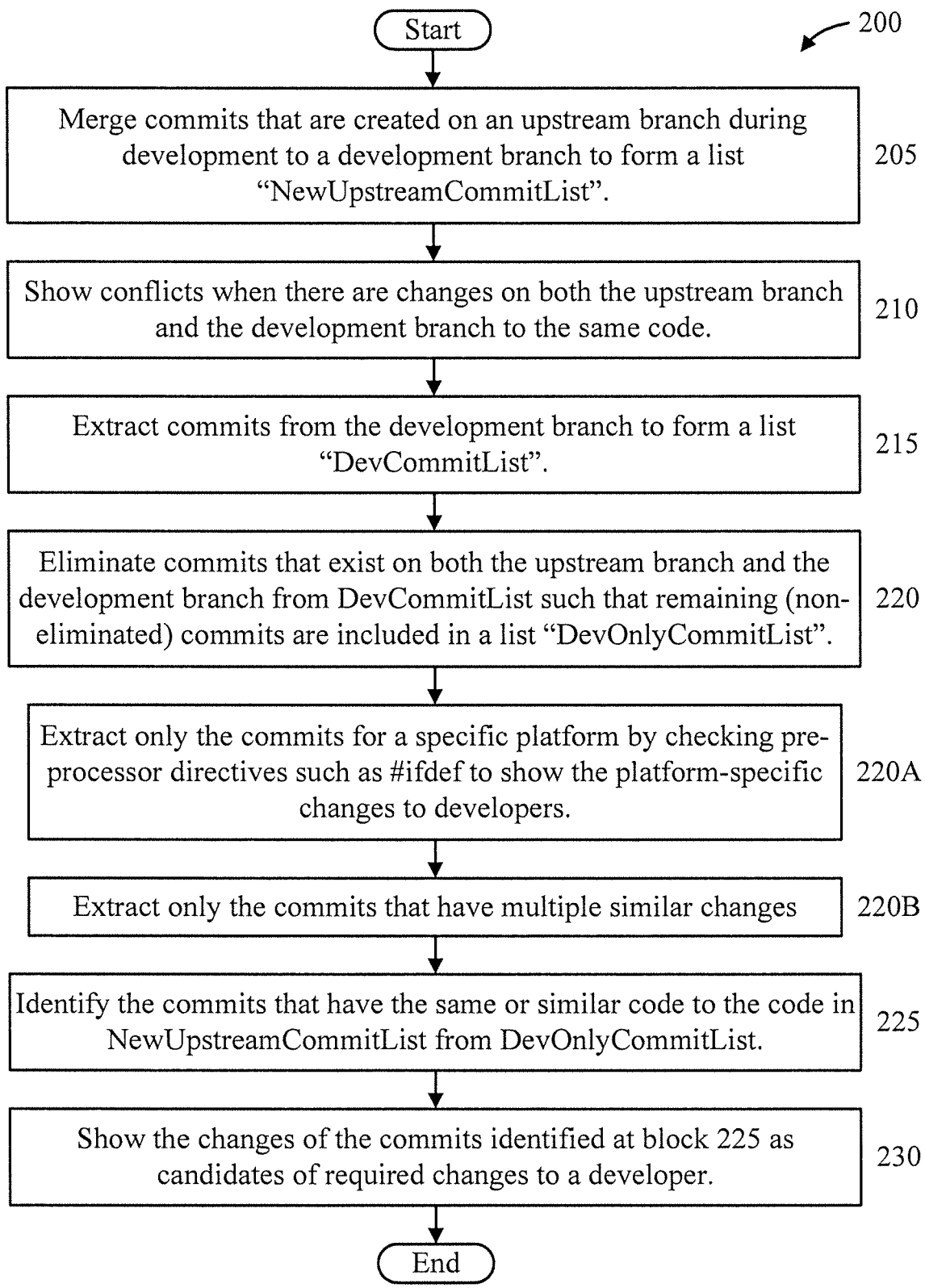
FIG. 2 is a block diagram showing an exemplary method for merging changes from upstream code to a development branch, in accordance with an embodiment of the present invention.

FIG. 2 is a block diagram showing an exemplary method 200 for merging changes from upstream code to a development branch, in accordance with an embodiment of the present invention.

At block 205, merge commits that are created on an upstream branch during development to a development branch to form a list "NewUpstreamCommitList".

At block 210, show conflicts when there are changes on both the upstream branch and the development branch to the same code. In an embodiments, the conflicts can be solved by developers manually, or using an automated conflict correction process.

At block 215, extract all of the commits from the development branch to form a list "DevCommitList". DevCommitList includes the commits that had been made on an upstream branch before creating a development branch.

At block 220, eliminate commits that exist on both the upstream branch and the development branch from DevCommitList such that remaining (non-eliminated) commits are included in a list "DevOnlyCommitList".

In an embodiment, block 220 can include one or more of blocks 220A and 220B.

At block 220A, extract only the commits for a specific platform by checking pre-processor directives such as #ifdef to show the platform-specific changes to developers. #ifdef relates to control conditional compilation, as it delimits blocks of program text that are compiled only if a specified condition is true. To that end, #ifdef only checks if the symbol is defined or not and does not care for the value of the symbol. If defined, the blocks are compiled.

At block 220B, extract only the commits that have similar changes. We call such commits similar commits. In order to identify the similar commits, the original code (i.e., the code before a change) in a commit is compared with the original code in the other commits. There are several options to implement the comparison. One simple approach is an exact match which identifies the commits that have the same original code. Another approach is to check if the code in two commits include the same function call, the access to the same variable, the access to the same macro (e.g., a constant value defined by the #define directive in C/C++ programming language, or the import of the same library (e.g., header files imported by the #include directive in C/C++ programming language, library modules imported by the import directive in Swift). These simple approaches will work for this invention which focuses on simple changes to a small piece of the code. Of course, we can extend this similarity check by existing source code similarity detection techniques.

At block 225, identify the commits that have the same or similar code to the code in NewUpstreamCommitList from DevOnlyCommitList. Similarity can be established by the same approaches mentioned hereinabove.

At block 230, show the changes of the commits identified at block 225 as candidates of required changes to a developer.

Figure 3:
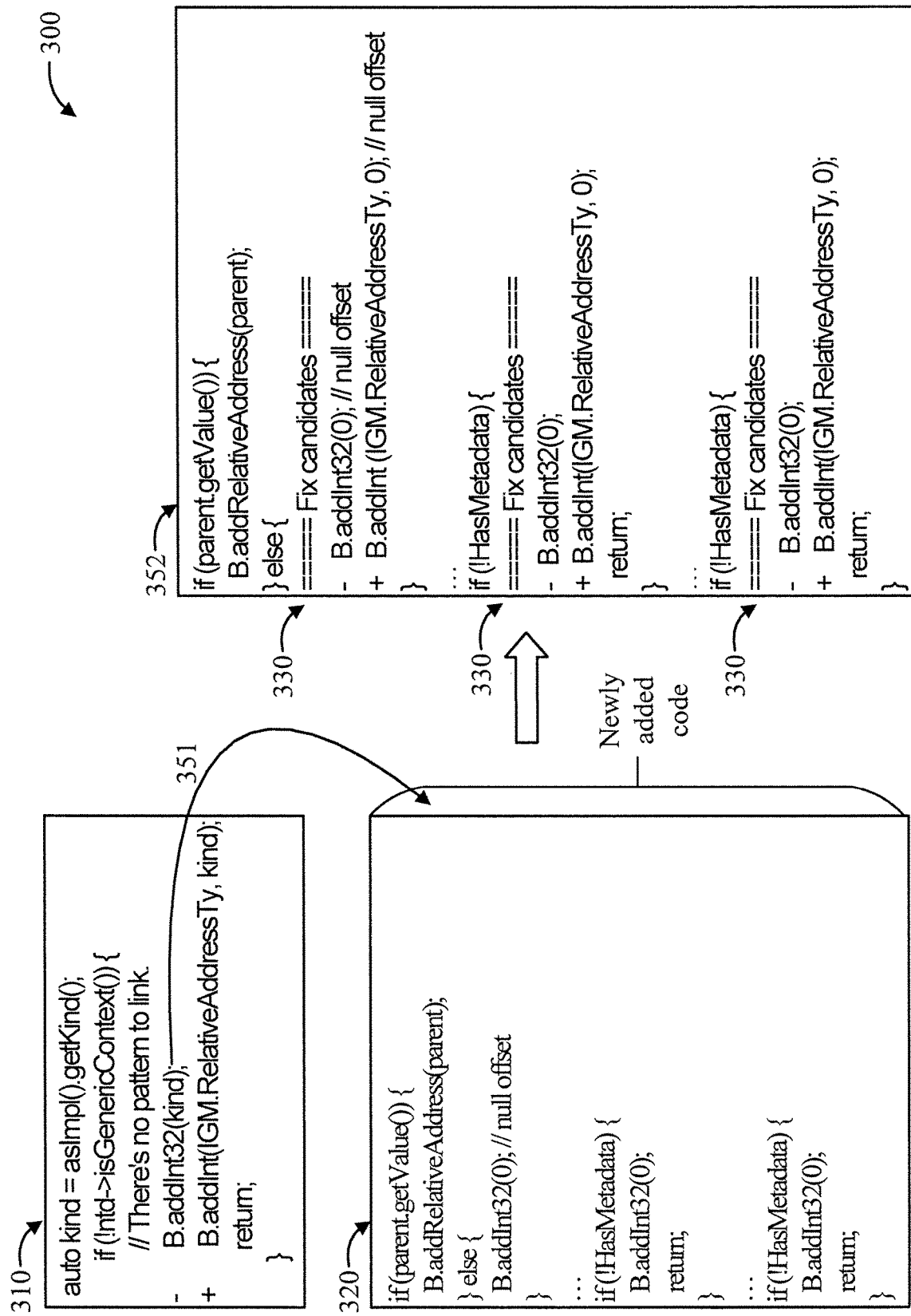
FIG. 3 is a high-level block/flow diagram showing a first example where similar code is added, in accordance with an embodiment of the present invention.

FIG. 3 is a high-level block/flow diagram showing a first example 300 where similar code is added, in accordance with an embodiment of the present invention.

Between a commit in a development branch 310 for IBM Z® in Swift 4.0.2 and a new commit in an upstream branch 320 in Swift 4.2, find 351 the code before a change (B.addInt32 in this example) in the upstream branch 320.

Relative to the new commit in the upstream branch 320 in Swift 4.2, show 352 the candidates 330 for changes. In this example, the entirety of the upstream branch 320 represents newly added code relative to the development branch 310, and thus candidates for changes.

Figure 4:
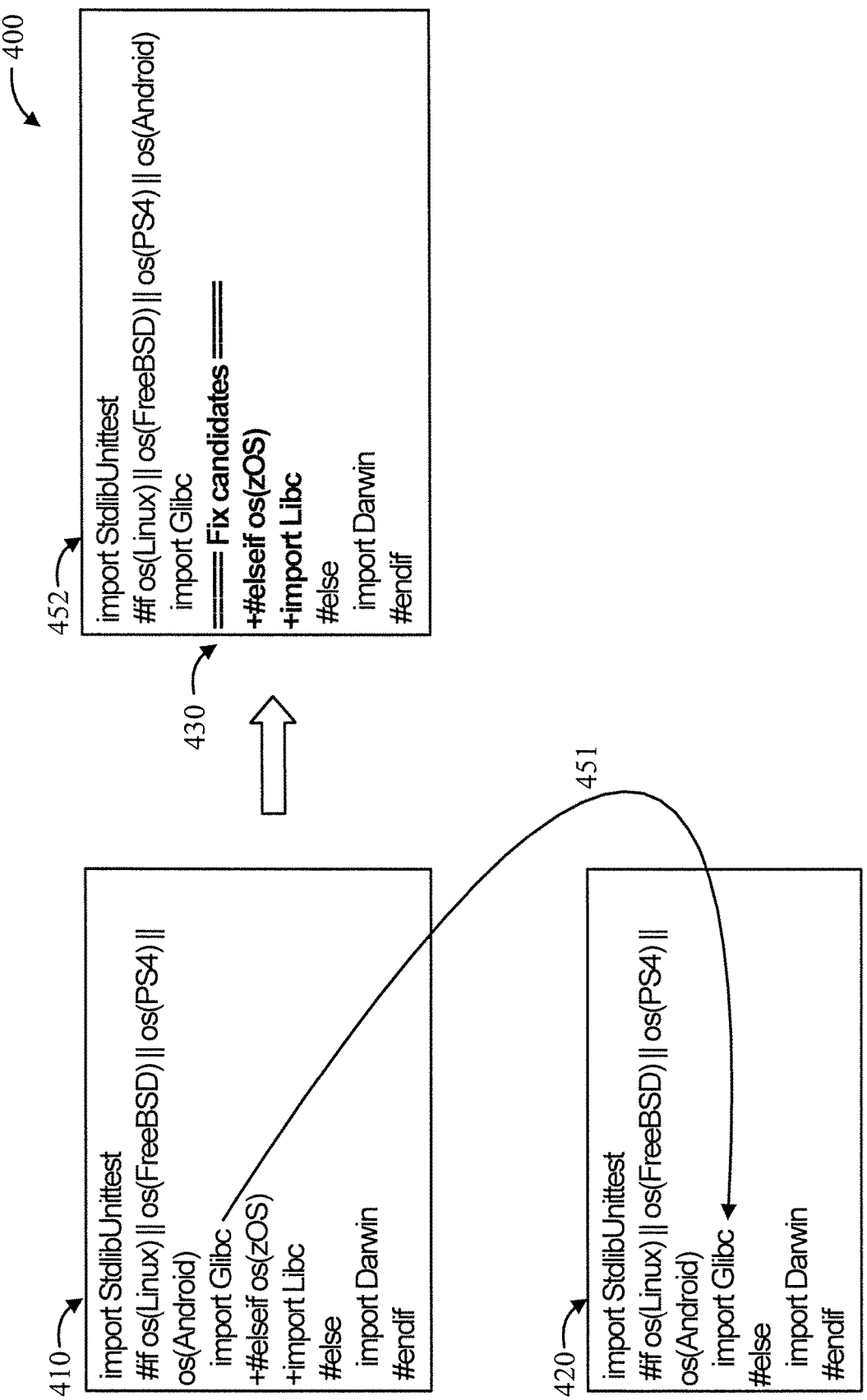
FIG. 4 is a high-level block/flow diagram showing a second example where changes are moved to another file, in accordance with an embodiment of the present invention.

FIG. 4 is a high-level block/flow diagram showing a second example 400 where changes are moved to another file, in accordance with an embodiment of the present invention.

Between a commit in a development branch 410 for IBM Z® in Swift 4.0.2 and a new commit in an upstream branch 420 in Swift 4.2, find 451 the code before a change (import Glibc and import Darwin in this example) in the development branch 410.

Relative to the commit in the development branch 410 for IBM Z® in Swift 4.0.2, show 452 the candidates 430 for changes (labeled "Fix candidates" in FIG. 4). In this example, a portion of the development branch 410 represents newly added code relative to the upstream branch 420.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
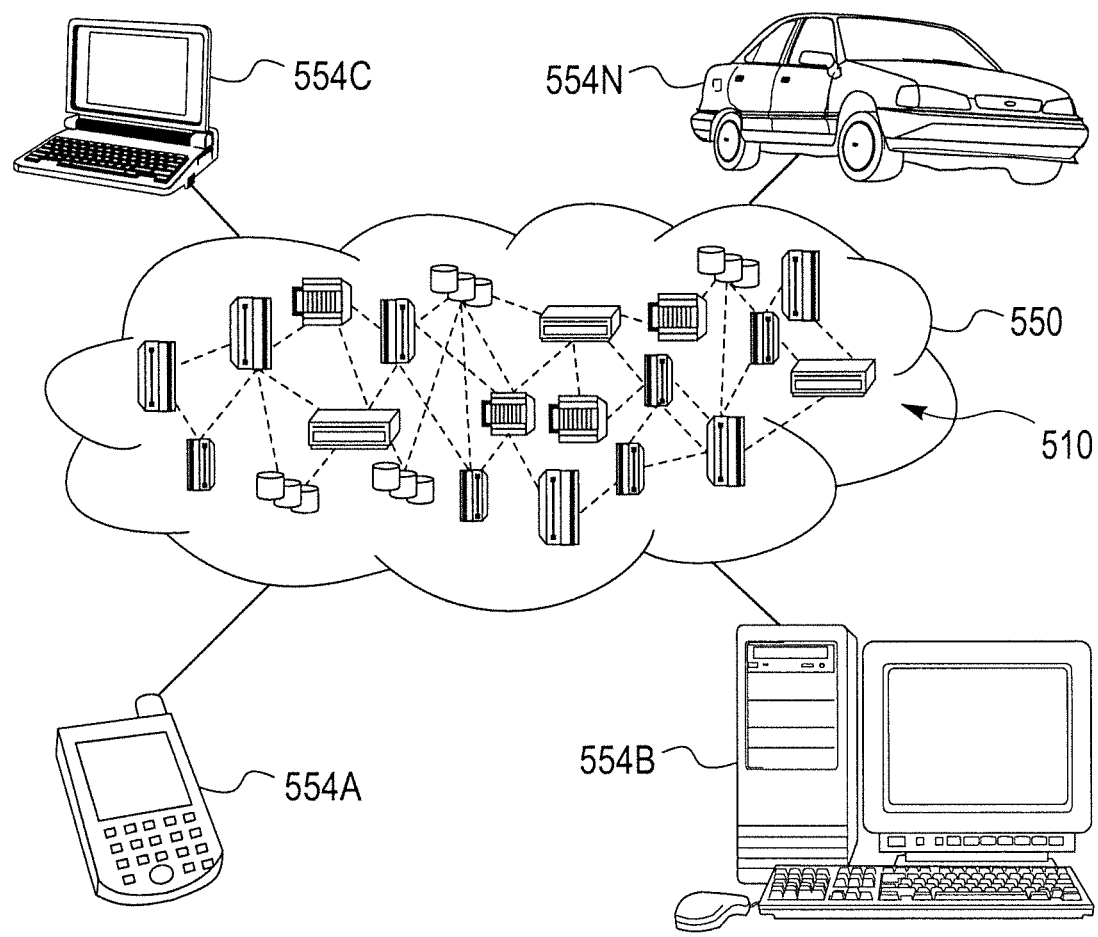
FIG. 5 is a block diagram showing an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
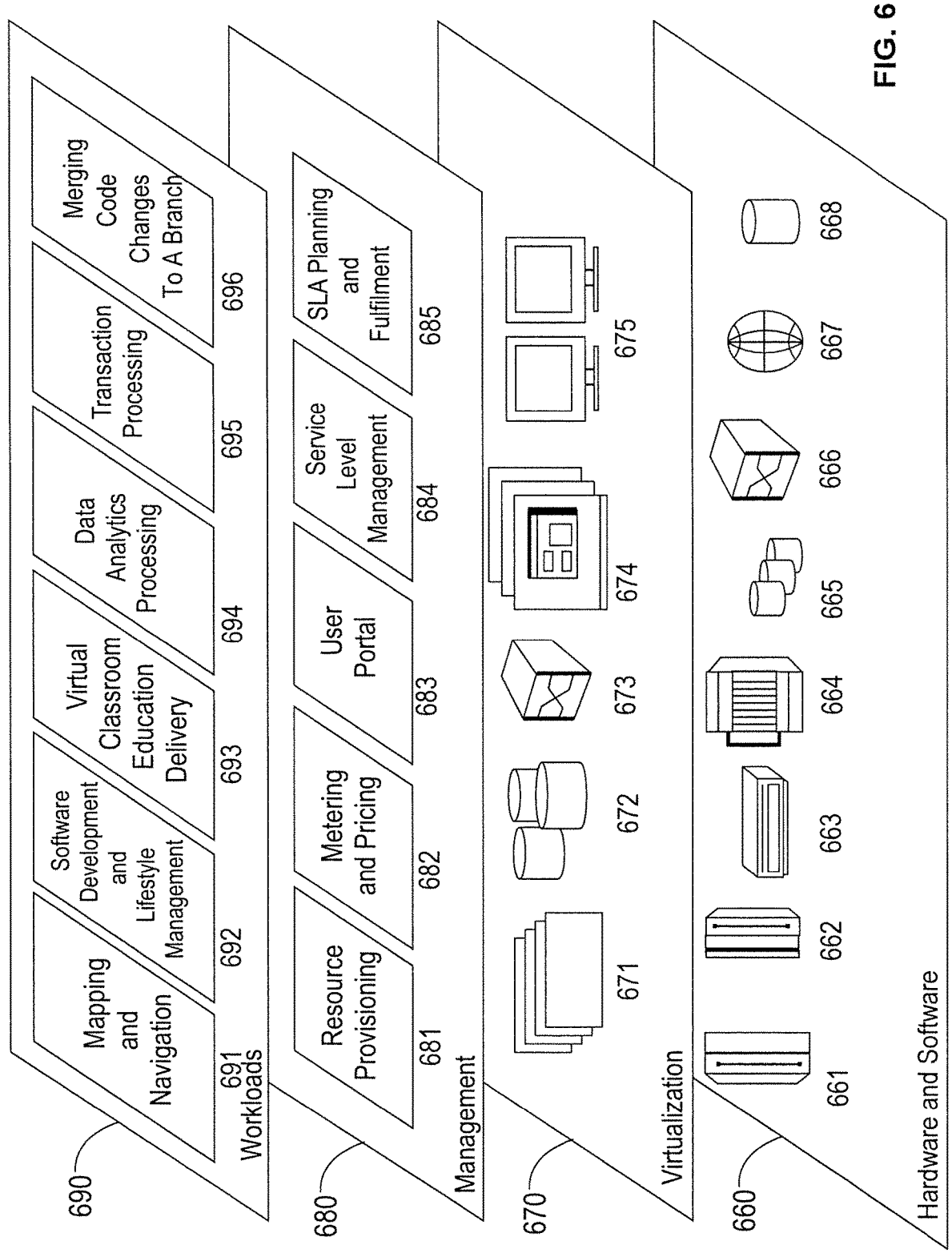
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 884 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and merging upstream code changes to a branch 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for program repository management, the method comprising:
    identifying commits in an upstream commit log of an upstream branch and commits in a development commit log of a development branch;
    extracting the commits in the development commit log of the development branch;
    identifying, by a hardware processor in the upstream commit log, a code which is identical or similar to the extracted commits from the commit log of the development branch;
    showing the identified code as a commit candidate of change in an upstream program code; and
    wherein in said step of identifying the code, the code is similar to the extracted commits of the development branch when there exists at least one common instruction there between.

2. The computer-implemented method of claim 1, further comprising eliminating, from consideration by said extracting step, any of the commits that exist in both the upstream commit log and the development commit log.

3. The computer-implemented method of claim 2, wherein said extracting step comprises extracting the commits only for a specific platform.

4. The computer-implemented method of claim 3, wherein the commits only for a specific platform are extracted while eliminating remaining ones of the commits including the commits that exist in both the upstream commit log and the development commit log.

5. The computer-implemented method of claim 3, wherein said extracting step further comprises identifying the commits only for the specific platform by checking preprocessor directives showing platform-specific changes.

6. The computer-implemented method of claim 1, wherein the changes originate from another computer program file.

7. The computer-implemented method of claim 1, wherein the program repository management system is comprised in a version control system.

8. A computer program product for program repository management, the computer program product comprising a non-transitory computer readable storage medium having program instructions embodied therewith, the program instructions executable by a computer of the program repository management system to cause the computer to perform a method comprising:

identifying commits in an upstream commit log of an upstream branch and commits in a development commit log of a development branch;

extracting the commits in the development commit log of the development branch;

identifying, by a hardware processor of the computer in the upstream commit log, a code which is identical or similar to the extracted commits from the commit log of the development branch;

showing the identified code as a commit candidate of change in an upstream program code;

and wherein in said step of identifying the code, the code is similar to the extracted commits of the development branch when there exists at least one common instruction there between.

9. The computer program product of claim 8, further comprising eliminating, from consideration by said extracting step, any of the commits that exist in both the upstream commit log and the development commit log.

10. The computer program product of claim 9, wherein said extracting step comprises extracting the commits only for a specific platform.

11. The computer program product of claim 10, wherein the commits only for a specific platform are extracted while eliminating remaining ones of the commits including the commits that exist in both the upstream commit log and the development commit log.

12. The computer program product of claim 10, wherein said extracting step further comprises identifying the commits only for the specific platform by checking preprocessor directives showing platform-specific changes.

13. The computer program product of claim 8, wherein the changes originate from another computer program file.

14. The computer program product of claim 8, wherein the program repository management system is comprised in a version control system.

15. A program repository management system, comprising:

a memory device including program code stored thereon;

a hardware processor, operatively coupled to the memory device, and configured to run the program code stored on the memory device to identify commits in an upstream commit log of an upstream branch and commits in a development commit log of a development branch;

extract the commits in the development commit log of the development branch;

identify, in the upstream commit log, a code which is identical or similar to the extracted commits from the commit log of the development branch; and show the identified code as a commit candidate of change in an upstream program code; and wherein in said step to identify the code, the code is similar to the extracted commits of the development branch when there exists at least one common instruction there between.

16. The program repository management system of claim 15, further comprising eliminating, from consideration by said extracting step, any of the commits that exist in both the upstream commit log and the development commit log.

17. The program repository management system of claim 16, wherein said extracting step comprises extracting the commits only for a specific platform.

18. The program repository management system of claim 17, wherein the commits only for a specific platform are extracted while eliminating remaining ones of the commits including the commits that exist in both the upstream commit log and the development commit log.

* * * * *